United States Patent
Khinkis et al.

(10) Patent No.: US 9,803,153 B2
(45) Date of Patent: Oct. 31, 2017

(54) RADIANT NON-CATALYTIC RECUPERATIVE REFORMER

(71) Applicants: Mark J. Khinkis, Morton Grove, IL (US); Aleksandr P. Kozlov, Buffalo Grove, IL (US)

(72) Inventors: Mark J. Khinkis, Morton Grove, IL (US); Aleksandr P. Kozlov, Buffalo Grove, IL (US)

(73) Assignee: Gas Technology Institute, Des Plaines, IL (US)

( * ) Notice: Subject to any disclaimer, the term of this patent is extended or adjusted under 35 U.S.C. 154(b) by 139 days.

(21) Appl. No.: 14/976,307

(22) Filed: Dec. 21, 2015

(65) Prior Publication Data
US 2016/0137940 A1    May 19, 2016

Related U.S. Application Data

(63) Continuation-in-part of application No. 13/086,433, filed on Apr. 14, 2011, now Pat. No. 9,216,396.

(51) Int. Cl.
*B01J 12/00* (2006.01)
*C10L 3/00* (2006.01)
(Continued)

(52) U.S. Cl.
CPC ............... *C10L 3/00* (2013.01); *B01J 12/007* (2013.01); *B01J 19/248* (2013.01); *B01J 19/249* (2013.01);
(Continued)

(58) Field of Classification Search
CPC ....... C10L 3/00; B01J 19/2425; B01J 19/248; B01J 12/007; B01J 19/249;
(Continued)

(56) References Cited

U.S. PATENT DOCUMENTS 4,900,333 A    2/1990 Bos
5,595,059 A    1/1997 Huber et al.
(Continued)

FOREIGN PATENT DOCUMENTS

EP    2 314 372 A1    4/2011

OTHER PUBLICATIONS

Declaration under 37 C.F.R. 1.132, Aleksandr P. Kozlov Jul. 23, 2015.*
(Continued)

*Primary Examiner* — Randy Boyer
*Assistant Examiner* — Juan Valencia
(74) *Attorney, Agent, or Firm* — Pauley Erickson & Kottis

(57) ABSTRACT

A radiant, non-catalytic recuperative reformer has a flue gas flow path for conducting hot exhaust gas from a thermal process and a reforming mixture flow path for conducting a reforming mixture. At least a portion of the reforming mixture flow path is positioned adjacent to the flue gas flow path to permit heat transfer from the hot exhaust gas to the reforming mixture. The reforming mixture flow path contains substantially no material commonly used as a catalyst for reforming hydrocarbon fuel (e.g., nickel oxide, platinum group elements or rhenium), but instead the reforming mixture is reformed into a higher calorific fuel via reactions due to the heat transfer and residence time. In a preferred embodiment, a portion of the reforming mixture flow path is positioned outside of flue gas flow path for a relatively large residence time.

20 Claims, 9 Drawing Sheets

(51) Int. Cl.
   *C01B 3/34* (2006.01)
   *B01J 19/24* (2006.01)
(52) U.S. Cl.
   CPC ............ *B01J 19/2425* (2013.01); *C01B 3/34* (2013.01); *B01J 2219/00081* (2013.01); *B01J 2219/00085* (2013.01); *B01J 2219/00087* (2013.01); *B01J 2219/00099* (2013.01); *B01J 2219/00157* (2013.01); *B01J 2219/00159* (2013.01); *B01J 2219/2453* (2013.01); *B01J 2219/2458* (2013.01); *B01J 2219/2462* (2013.01); *B01J 2219/2479* (2013.01); *B01J 2219/2482* (2013.01); *B01J 2219/2486* (2013.01); *C01B 2203/0216* (2013.01); *C01B 2203/0222* (2013.01); *C01B 2203/0811* (2013.01); *C01B 2203/1235* (2013.01); *C01B 2203/1241* (2013.01); *C01B 2203/148* (2013.01)
(58) Field of Classification Search
   CPC .... B01J 2219/00157; B01J 2219/00081; B01J 2219/00085; B01J 2219/00099; C01B 3/34; C01B 2203/1235; C01B 2203/0222; C01B 2203/0811
   See application file for complete search history.

(56) References Cited

U.S. PATENT DOCUMENTS

| | | | |
|---|---|---|---|
| 7,207,323 | B1 | 4/2007 | Hemsath |
| 2007/0028860 | A1* | 2/2007 | Hemsath ............... B01J 8/008 123/3 |
| 2009/0011290 | A1* | 1/2009 | Chudnovsky ........ B01J 19/0013 429/423 |
| 2012/0264986 | A1 | 10/2012 | Khinkis et al. |

OTHER PUBLICATIONS

Declaration under 37 C.F.R. 1.132, Harry S. Kurek Jul. 22, 2015.*
Declaration under 37 C.F.R. 1.132, David M. Rue Jul. 23, 2015.*
Declaration under 37 C.F.R. 1.132, Yaroslav Chudnovsky Jul. 23, 2015.*
Maruoka N. et al., "Feasibility Study for Recovering Waste Heat in the Steelmaking Industry Using a Chemical Recuperator," IsIJ International, vol. 44, No. 2, pp. 257-262.

* cited by examiner

RADIANT NON-CATALYTIC RECUPERATIVE REFORMER

CROSS-REFERENCE TO RELATED APPLICATIONS

This application is a continuation-in-part of U.S. application, Ser. No. 13/086,433, filed on 14 Apr. 2011. The co-pending parent application is hereby incorporated by reference herein in its entirety and is made a part hereof, including but not limited to those portions which specifically appear hereinafter.

NOTICE OF GOVERNMENT INTEREST

This invention was developed under Grant No. DE-FG36-08GO18130 awarded by the U.S. Department of Energy, and the Government of the United States of America may have certain rights in this invention pursuant to that grant.

BACKGROUND OF THE INVENTION

Field of the Invention

The present invention relates to a method and apparatus for reforming hydrocarbon fuel into a higher calorific fuel, and in particular relates to a method and apparatus for reforming fuel that does not require any of the catalysts commonly used in reforming hydrocarbon fuel.

Description of the Prior Art

Many processes, especially in industrial applications, produce large amounts of excess heat—i.e., heat beyond what can be efficiently used in the process. Waste heat recovery methods attempt to extract and utilize some of the energy from the excess heat that otherwise would be wasted. Typical methods of recovering heat in industrial applications include direct heat recovery to the process itself, recuperators, regenerators, and waste heat boilers.

One particular method of waste heat recovery is based on fuel thermochemical recuperation (TCR). A TCR system can include one or more recuperative reformers, one or more air recuperators, a steam generator, and other necessary components. TCR recovers sensible heat in flue gas (i.e., exhaust gas) from a thermal process (e.g., combustion in a furnace, engine, etc.) and uses that heat to endothermically transform a hydrocarbon fuel source (for example, a fossil fuel such as petroleum, natural gas, or landfill gas) into a reformed fuel with a higher calorific heat content. In particular, the reforming process uses hot flue gas components (such as $H_2O$ and $CO_2$), steam, and/or $CO_2$ (landfill gas) to convert the fuel into a combustible mixture of hydrogen ($H_2$), carbon monoxide (CO), and unreformed hydrocarbons ($C_nH_m$).

The most studied and widespread reforming process is natural gas (methane) reforming with steam, known as a steam methane reforming (SMR). The SMR process is the most common method of hydrogen production. This process is realized by two main reactions: $CH_4+H_2O \rightarrow CO+3H_2$ and $CO+H_2O \rightarrow CO_2H_2$. The first reaction is strongly endothermic and usually realized at high temperatures (1380° F.-1470° F.) over a nickel catalyst. The second reaction, known as a water gas shift reaction, is mildly exothermic and usually realized at lower temperatures (370° F.-660° F.) over a nickel catalyst.

Natural gas reforming with flue gas is realized by the same two reactions and one additional endothermic reaction of methane with carbon dioxide: $CH_4+CO_2 \rightarrow 2CO+2H_2$. So in the TCR process, steam ($H_2O$) and carbon dioxide ($CO_2$) are reacting with fuel to produce reformed fuel with higher calorific value. In contrast to the SMR process, hydrogen production is not the only purpose of the TCR process. In the TCR process it is usually more important to increase calorific value of the fuel rather than produce hydrogen. Because of that, the exothermic water gas shift reaction is optional for the TCR process and can be eliminated.

Another possible reaction of the TCR and SMR processes is direct cracking of the hydrocarbon fuel. Cracking produces hydrogen and solid carbon. If the reforming process is conducted over a catalyst, the filamentous carbon eventually deactivates the catalyst. While catalysts are used in the SMR process for hydrogen production and cracking is undesirable, non-catalytic recuperative reforming would be very attractive for use in the TCR process when solid carbon can be utilized as a combustible together with the reformed fuel.

The calorific content of the fuel can be increased significantly. For example, if the original fuel source is natural gas (where methane is the main component), the calorific content can be increased by up to approximately 28%. When this reformed fuel is combusted in a furnace, fuel economy is improved, system efficiency is increased, and emissions are reduced. Because both $H_2O$ and $CO_2$ can be utilized in the reforming process, it is advantageous for natural gas-fired systems since both of these gases are major products of combustion and are therefore readily available in a preheated state. If steam is available for the process, or if a heat recovery boiler can be installed together with the reformer, then the steam can be used to reform the fuel.

TCR as a process has been investigated for a number of applications (See, e.g., Maruoka N. et al., "Feasibility Study for Recovering Waste Heat in the Steelmaking Industry Using a Chemical Recuperator," IsIJ International, Vol. 44, 2004, No. 2, pp. 257-262; Yap D. et al., "Natural gas HCCI engine operation with exhaust gas fuel reforming," International Journal of Hydrogen Energy, 2006, Vol. 31, pp. 587-595; and U.S. Pat. No. 7,207,323.) The results of these investigations showed that a catalyst is required to reform the fuel. Thus, existing recuperative reformers for TCR systems are catalytic.

Most catalysts used in catalytic reformers contain nickel oxide, platinum, or rhenium on a silica, alumina, or a silica-alumina support base, and some contain both platinum and rhenium. Other platinum group elements may also be used. The activity (i.e., effectiveness) of the catalyst in a catalytic reformer is reduced over time during operation by carbon deposition. The activity of the catalyst can be periodically regenerated or restored by in situ high temperature oxidation of the carbon. Typically, catalytic reformers are regenerated about once every 6 to 24 months, and the catalyst normally can be regenerated about 3 or 4 times before it must be returned to the manufacturer for reclamation of the valuable platinum and/or rhenium content.

The use of an expensive catalyst in the reformer increases the reformer capital cost. Further, the necessary periodic regeneration of the catalyst—and the eventual need to replace the catalyst after it is regenerated a few times—also drives up the system cost. As a result, in many applications—especially those with low-temperature waste heat streams, such as automotive applications—the economic benefits of waste heat recovery do not justify the cost of the recovery systems.

Innovative, affordable methods that are highly efficient and suitable for use with corrosive or "dirty" wastes could expand the number of viable applications of waste heat recovery, as well as improve the performance of existing applications.

SUMMARY OF THE INVENTION

The present invention is applicable, for example, to a waste heat recovery system and method for use in heating applications such as heat treat furnaces, melters, burners, engines, turbines, etc., where a hydrocarbon fuel is used for combustion with air, oxygen-enriched air, or oxygen.

According to one preferred embodiment, the present invention provides a recuperative reformer having (1) a preheater section comprising (i) a first portion of a flue gas flow path and (ii) a first portion of a reforming mixture flow path that is at least partially embedded within the first portion of the flue gas flow path to permit heat transfer between flue gas in the flue gas flow path and reforming mixture in the reforming mixture flow path and (2) a reactor section comprising (i) a second portion of the flue gas flow path and (ii) a second portion of the reforming mixture flow path that is at least partially embedded within the second portion of the flue gas flow path to permit heat transfer between flue gas in the flue gas flow path and reforming mixture in the reforming mixture flow path.

The flue gas flow path is configured to receive hot flue gas from a thermal process, the first portion of the reforming mixture flow path is configured to receive a gaseous reforming mixture have a volumetric flow rate and the second portion of the reforming mixture flow path is configured to receive the reforming mixture from the first portion of the reforming mixture flow path, and the reforming mixture flow path contains substantially no catalyst. Further, at least a part of the second portion of the reforming mixture flow path contains extended surfaces of metal material, and the second portion of the reforming mixture flow path is configured to provide residence time greater than or equal to a predetermined threshold for the reforming mixture having the volumetric flow rate.

According to a second preferred embodiment, the present invention provides a thermal waste recovery system that includes a non-catalytic recuperative reformer, the reformer having (i) a flue gas flow path configured to receive flue gas from the outlet of a reaction chamber and (ii) a reforming mixture flow path configured to receive a reforming mixture having a volumetric flow rate and to output a reformed fuel. At least a portion of the reforming mixture flow path is embedded within the flue gas flow path to permit heat transfer between flue gas in the flue gas flow path and reforming mixture in the reforming mixture flow path, and the reforming mixture flow path contains substantially no catalyst. Further, at least a portion of the reforming mixture flow path contains extended surfaces of metal material, and the reforming mixture flow path is configured to provide residence time greater than or equal to a predetermined threshold for the reforming mixture having the volumetric flow rate.

According to yet another preferred embodiment, the present invention provides a method of reforming hydrocarbon fuel into higher calorific fuel. The method includes the steps of (i) introducing hot flue gas from a thermal process into a flue gas flow path of a reformer, (ii) introducing a reforming mixture having a volumetric flow rate into a reforming mixture flow path of a reformer, wherein at least a portion of the reforming mixture flow path is embedded in the flue gas flow path to permit heat transfer from the flue gas in the flue gas flow path to the reforming mixture in the reforming mixture flow path, wherein the reforming mixture flow path contains substantially no catalyst, and wherein the reforming mixture flow path is configured to provide a residence time equal to or greater than a predetermined threshold for the reforming mixture having the volumetric flow rate, and (iii) outputting reformed fuel from an outlet of the reforming mixture flow path.

In another embodiment, the present invention provides a radiant, non-catalytic recuperative reformer which includes a duct, a radiant section positioned within the duct and a collector positioned outside of the duct. The duct is configured to receive hot flue gas from a thermal process and provide a flue gas flow path through the duct. In a preferred embodiment, the flue gas temperature ranges from 2,000° F. to 2,800° F. For example, the hot flue gas may be an exhaust gas from a steel making process. However, the flue gas need not be provide by a steel making process and may be provided by any process capable of providing gas in the temperature range provided above.

The radiant, non-catalytic recuperative reformer of this invention further includes a reforming mixture flow path which is at least partially positioned within a wall of the duct to permit heat transfer between flue gas in the flue gas flow path and a reforming mixture in the reforming mixture flow path. In an embodiment of this invention, the reforming mixture comprises one of a mixture of hydrocarbon fuel and flue gas, a mixture of fuel and steam, a mixture of fuel and carbon dioxide, or a mixture of fuel with flue gas and steam. The method of this invention produces a reformed fuel which may contain a combustible mixture of hydrogen ($H_2$), carbon monoxide (CO) carbon dioxide ($CO_2$), nitrogen ($N_2$), water vapor ($H_2O$) and unreformed hydrocarbons ($C_nH_m$).

In an embodiment of this invention, the reforming mixture flow path includes an entrance duct connected to a plurality of conduits, the conduits are preferably positioned within the wall of the duct to permit heat transfer between the flue gas and the reforming mixture. The plurality of conduits further connect to a collector section preferably positioned outside of the duct to allow for less heat transfer between the flue gas and the reforming mixture in the collector. The reforming mixture then passes through another set of conduits, preferably positioned within the wall of the duct, to an exit pipe. In this embodiment, a cross-sectional area of the each of the conduits is smaller than a cross-sectional area of the collector providing a high-velocity, short residence time for the reforming mixture in the conduits relative to a low-velocity and large residence time the reforming mixture in the collectors. In one embodiment of this invention, the reforming mixture includes a residence time in the conduit of one second and a residence time in the collector of ten seconds. However, it should be understood that the residence times may vary for different applications.

By performing fuel reforming using substantially no material that is commonly used as a catalyst to reform hydrocarbon fuel, which material is generally quite expensive and suffers from reduced performance over time due to coke deposition, the initial cost of the reformer is lowered and the maintenance cost is decreased by avoiding the need to periodically regenerate, and eventually replace, the catalyst.

Further aspects of the present invention will be understood from the detailed description of preferred embodiments below, taken in conjunction with the accompanying figures.

DETAILED DESCRIPTION OF THE PREFERRED EMBODIMENTS

Currently preferred embodiments of the invention will be described with respect to FIGS. 1 through 11.

Figure 1:
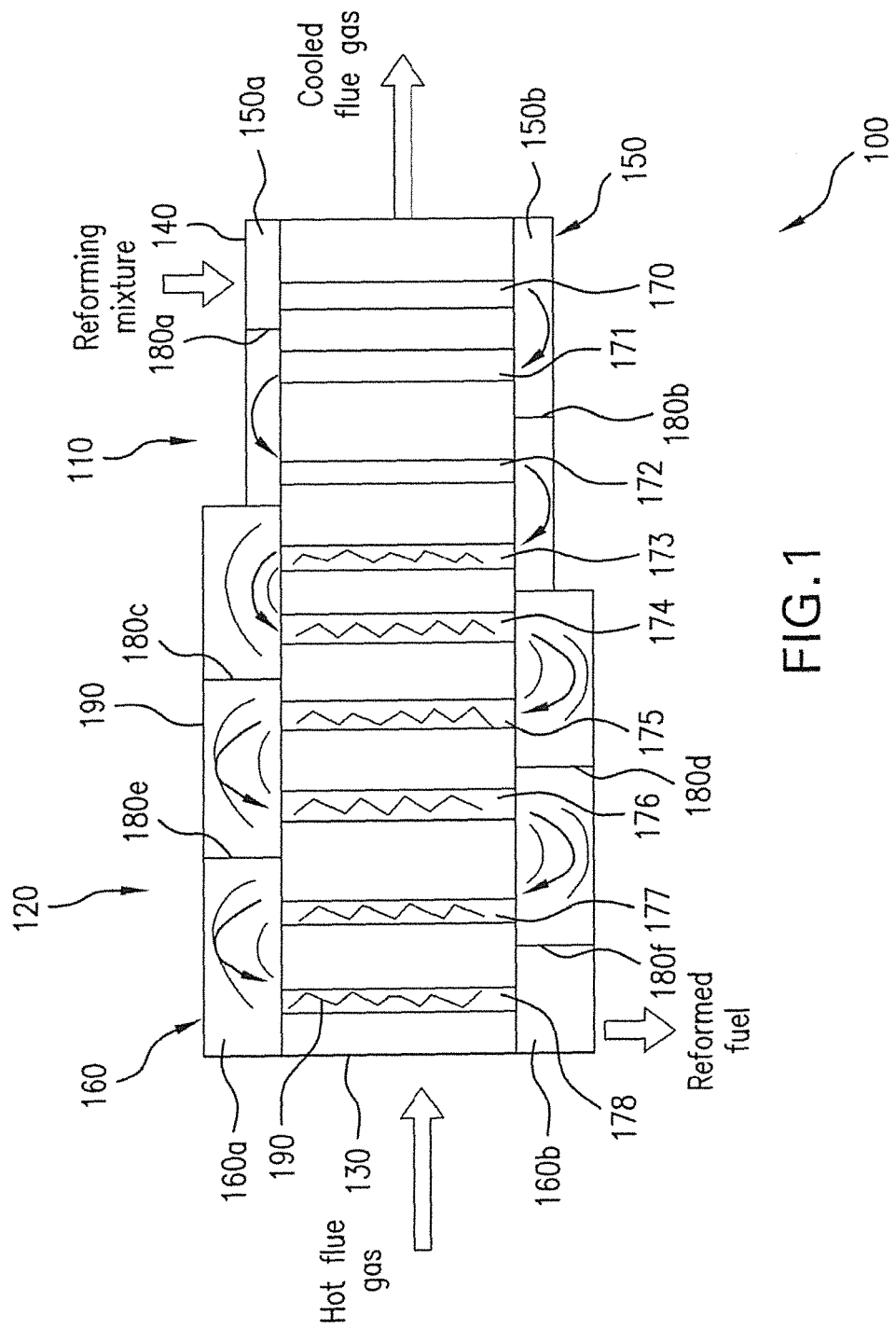
FIG. 1 depicts a flow diagram for one preferred embodiment of a non-catalytic recuperative reformer according to the present invention, which uses a tubular design.

FIG. 1 shows a flow diagram of a recuperative reformer 100 according to a first preferred embodiment of the present invention. As shown in FIG. 1, the reformer 100 in this embodiment has two sections: a preheater section 110 and a reactor section 120. A flue gas flow path 130 passes through both the reactor section 120 and the preheater section 110. Likewise, a reforming mixture flow path 140 passes through both the preheater section 110 and the reactor section 120.

The reforming mixture flow path 140 is preferably formed by one or more plenum, a plurality of conduit sections that pass through the flue gas flow path, and one or more baffles. In particular, in the preferred embodiment shown in FIG. 1 a first portion of the reforming mixture flow path 140, which is contained in the preheater section 110 of the reformer, includes (1) a plenum 150 having a first portion 150a on one side of the flue gas flow path and a second portion 150b on the opposite side of the flue gas flow path, (2) conduit sections 170, 171, 172, and 173, and (3) baffles (or partitions) 180a and 180b. Similarly, a second portion of the reforming mixture flow path 140, which is contained in the reactor section 120 of the reformer and receives the reforming mixture from the first portion of the reforming mixture flow path, includes (1) a plenum 160 having a first portion 160a on one side of the flue gas flow path and a second portion 160b on the opposite side of the flue gas flow path, (2) conduit sections 174, 175, 176, 177, and 178, (3) baffles 180c, 180d, 180e, and 180f, and extended surfaces of metal material. (As shown in FIG. 1, conduit section 173 marks the transition point from the preheater section 110 to the reactor section 120, but this transition could occur at other points.)

The reforming mixture enters plenum 150 at the first plenum portion 150a and, due to baffle 180a, must flow through conduit section 170 to the second plenum portion 150b. Baffle 180b then forces the reforming mixture to flow through conduit section 171 back to the first plenum portion 150a, and then the reforming mixture flows through conduit sections 172 and 173. Similarly, baffles 180c, 180d, 180e, and 180f guide the reforming mixture through plenum section 160a, conduit section 174, plenum second 160b, conduit section 175 and so on through the remaining conduit sections 176, 177, and 178, to an outlet of the reforming mixture flow path.

At least a part of the reforming mixture flow path, and in particular at least a part of the second portion of the reforming mixture flow path, contains extended surfaces of metal material 190 (in addition to the walls of the conduit sections, when the conduits are made of metal). In the preferred embodiment shown in FIG. 1, the extended surfaces of metal 190 are located at least in the conduit sections 173 through 178 and in the plenum 160. The extended surfaces of metal 190 may also be included in the first portion of the reforming mixture flow path. The extended surfaces of metal material 190 provide high heat transfer and reforming reaction rates.

As depicted in FIG. 1, this preferred embodiment uses counter-current flow between the flue gas and the reforming mixture, i.e., the flue gas flows through the reformer in a direction substantially opposite to the direction in which the reforming mixture flows through the reformer. More specifically, hot flue gas enters the reformer at the reactor section 120 and exits as cooled flue gas at the preheater section 110, while the reforming mixture enters the reformer at the opposite end, i.e., at the preheater section 110, and exits the reformer as reformed fuel at the reactor section 120. However, different flow arrangements between the flue gas and the reforming mixture in the reformer are possible, such as co-current flow, cross flow, or cross-parallel flow.

The reformer 100 is preferably made of metal. However, the present invention is not limited to the use of metal, and the reformer 100 (in particular, the flue gas flow path 130 and the reforming mixture flow path 140) can be made of appropriate materials that are adequate to withstand the temperatures and pressures of the flue gas and the reforming mixture, do not react in an undesirable manner with the gas flows, and provide appropriate heat transfer characteristics to transfer sufficient heat from the flue gas to the reforming mixture to promote the desired chemical reactions. Notably, however, it is preferred that the reformer include no catalytic material commonly used in reforming hydrocarbon fuels, such rhenium, platinum, or other members of the platinum group (e.g., ruthenium, rhodium, palladium, iridium, and osmium). The extended surfaces of metal material 190 can be made of commonly used metal plates or foils such as stainless steel or metal alloys.

Figure 2:
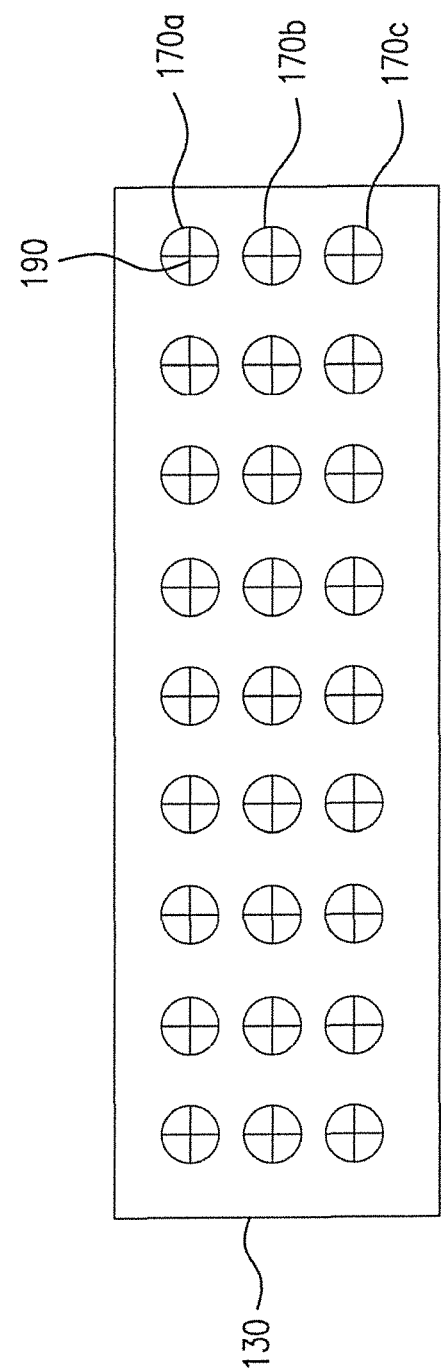
FIG. 2 depicts a cross-sectional view of the top of the reformer depicted in FIG. 1.

FIG. 2 depicts a cross-sectional view taken along the longitudinal centerline of the reformer 100 depicted in FIG. 1. In this preferred embodiment, the conduit sections that pass through the flue gas flow path from one plenum portion to another are tubular. Specifically, they are metal pipes. As shown in FIG. 2, the pipes are arranged substantially perpendicular to the flow of flue gas through the flue gas flow path 130, and the flue gas substantially surrounds the metal pipes as it flows past them. As further shown in FIG. 2, a conduit section can comprise a plurality of parallel pipes, for example, conduit section 170 comprises pipes 170a, 170b, and 170c.

Further, in this preferred embodiment the extended surfaces of metal material 190 (e.g., inserts), made of stainless steel or a metal alloy, are used inside the metal pipes to intensify heat transfer and promote chemical reactions. The extended surfaces of metal material may be located inside plenum 160 and also, optionally, plenum 150 in addition to being located inside the conduit sections. Although FIG. 2 depicts the extended surfaces of metal material as being located in all the conduit sections, as mentioned above they may located in only the conduct sections in the second portion of the reforming mixture flow path, or in only a part of the second portion of the reforming mixture flow path. Also, although the cross-sections of the extended surfaces of metal in FIG. 2 depict the extended surfaces as extending in both the vertical and horizontal direction, they are not limited to having this particular cross-section.

The reformer 100 shown in FIGS. 1 and 2 operates in the following way. Hot flue gas from a thermal process passes through the reactor section 120 first and then through the preheater section 110. The hot flue gas is used as a heat source to promote chemical reactions in the reformer and also to preheat the reforming mixture. The flue gas mainly consists of, for example, nitrogen (about 71% vol. of $N_2$), water vapor (about 19% vol. of $H_2O$), and carbon dioxide (about 10% vol. of $CO_2$). The reforming mixture can be, for example, a mixture of hydrocarbon fuel and flue gas, a mixture of the fuel and steam, a mixture of the fuel and carbon dioxide, or a mixture of the fuel with flue gas and steam. The reformed fuel contains a combustible mixture of hydrogen ($H_2$), carbon monoxide (CO) carbon dioxide ($CO_2$), nitrogen ($N_2$), water vapor ($H_2O$) and unreformed hydrocarbons ($C_nH_m$), including methane (if the fuel is natural gas).

The temperature of the hot flue gas can be up to approximately 3500° F., so the reformer 100 must be designed to accommodate such temperatures. The temperature of the reforming mixture in the reactor section 120 should be higher than 350° F. in order to promote chemical reactions. Preferably, the temperature of the reforming mixture in the reactor section 120 should be in the range of 800° F.-2400° F. depending on the fuel composition, application, and economics. The reactor section 120 should be designed to maintain the reforming mixture at a temperature in the desired range, for example, by ensuring sufficient surface area contact between the reforming mixture flow path and the flue gas flow path and sufficient residence time in the reactor section 120.

The preheater section 110 is used to increase the reforming mixture temperature to a value at which chemical reactions can start and can be intensive. The reforming mixture temperature at the preheater section outlet, when it passes into the reactor section 120, is preferably (but not necessarily) the same as the reforming mixture temperature at the reactor section outlet. In this case, the heat flow from flue gas to the reforming mixture in the reactor section would be consumed to compensate heat absorption due to endothermic chemical reactions.

Residence time is calculated as the volume of the reforming mixture flow path divided by the volumetric flow rate, and it is equal to 1/space velocity. (When the reforming mixture flow path has multiple sections, such as a reactor section and a preheater section, the calculation can use just the volume of the relevant section of the reforming mixture flow path, e.g., the reactor section, to focus on the residence time in the reactor section.) The volume of plenum 160 should provide necessary residence time for the chemical reactions. The desired total volume of the plenum 160 and the conduit sections in the reactor section 120 (i.e., the volume of the second portion of the reforming mixture flow path) depends on the area of the extended surfaces of metal material 190, the type of material, and the reforming fuel composition, and it can be estimated based on residence time or space velocity of the reforming fuel in the reactor section 120.

Preferably, the maximum value of the space velocity is approximately 3600 $hr^{-1}$ which is estimated based on standard conditions (for example, 60° F. and 14.7 psi absolute pressure), and more preferably the maximum value of the space velocity is in a range of approximately 30 $hr^{-1}$ to 3600 $hr^{-1}$. In other words, the residence time should be greater than or equal to a predetermined threshold, and that threshold is preferably 1 second-2 minutes. The lowest residence time (1 second) is applicable when the surface area of metal surface is extremely extended, the metal has high nickel content, and the temperature of the reforming mixture is high (>1800° F.). The highest residence time (2 minutes) is applicable when the surface area of metal surface is not extended or is slightly extended and the temperature of the reforming mixture is low (<1800° F.). The term "extended surface area" means that the surface area which is in contact with a reforming mixture is higher than the heat transfer surface area required for efficient heat transfer. The heat transfer area is a surface area which is needed to heat up the reforming mixture and maintain the required temperature of the reforming mixture during endothermic reactions. More nickel content in the metal would decrease the needed residence time since nickel promotes the chemical reactions. More nitrogen (at a higher flue gas/natural gas ratio) in the reforming mixture would increase the needed residence time and the reformer size.

For example, as a hypothetical example, when the reforming mixture primarily comprises 3 moles of flue gas and 1 mole of natural gas and has a flow rate of 100 SCFH, and the pipes 173 through 178 together with plenum 160 have total volume of about 0.3 $ft^3$, the space velocity would be about 333 $hr^{-1}$, and the total area of extended surfaces of metal material would preferably be about 10 $ft^2$ if high nickel alloy material (for example, greater than about 80% nickel by weight) is used.

Figure 3:
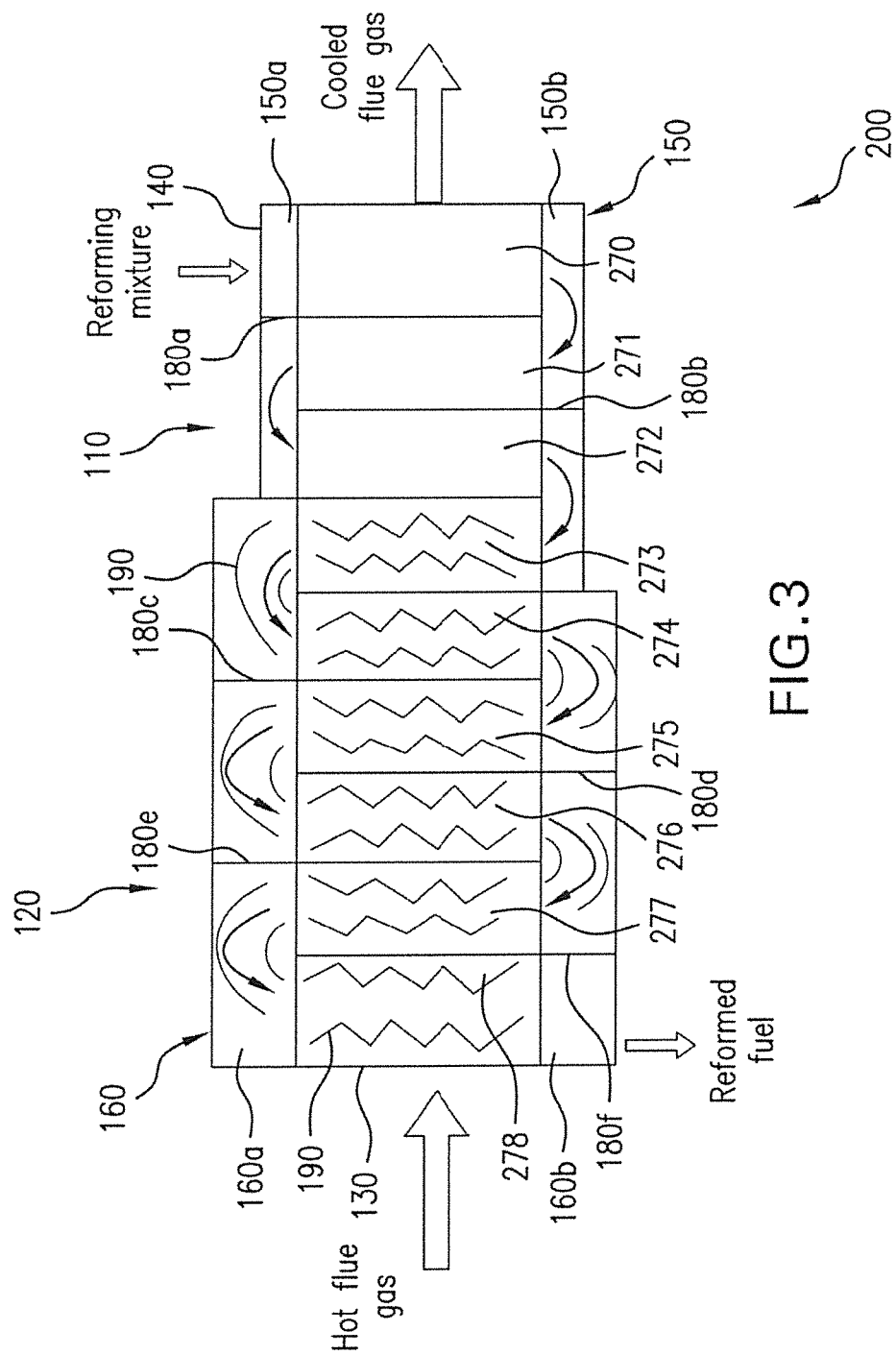
FIG. 3 depicts a flow diagram for another preferred embodiment of a non-catalytic recuperative reformer according to the present invention, which uses a plate design.

A second preferred embodiment of a recuperative reformer according to the present invention will be described with respect to FIGS. 3 and 4. FIG. 3 depicts a flow diagram of the second preferred embodiment. Parts that remain substantially the same as the corresponding parts in the first preferred embodiment are labeled with the same reference numbers.

In the second preferred embodiment, the conduit sections of reformer 200 that pass through the flue gas flow path between the different portions of plenum 150 and plenum 160 are flat, plate-shaped channels rather than tubular pipes as in the first preferred embodiment. Thus, in this embodiment the reforming mixture flows through channels 270 through 278, passing between the different portions of plenum 150 and plenum 160, so that the reforming mixture flow path 140 passes through the flue gas flow path 130 multiple times.

Figure 4:
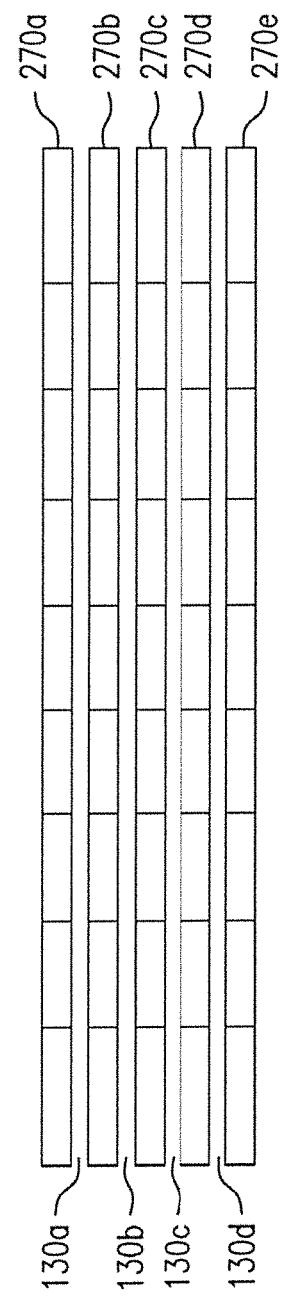
FIG. 4 depicts a cross-sectional view of the top of the reformer depicted in FIG. 3.

FIG. 4 depicts a cross-sectional view taken along a longitudinal centerline of the reformer 200 depicted in FIG. 3. As shown in FIG. 4, the conduit sections each comprise a plurality of parallel plate-shaped channels. For example, conduit section 270 comprises channels 270a, 270b, 270c, 270d, and 270e. The flue gas flow path also comprises a plurality of plate-shaped flow paths 130a, 130b, 130c, and 130d, through which the flue gas flows in a direction substantially perpendicular to the direction in which the reforming mixture flows through conduit sections 270 through 278. In this embodiment, the conduit sections and plenum 150 and plenum 160 also may have extended surfaces of metal material 190 such as stainless steel or metal alloy.

Those skilled in the art will appreciate that other configurations of the flue gas flow path and the reforming mixture flow path are possible, as long as sufficient heat transfer occurs between the flue gas and the reforming mixture to permit the necessary reactions in the reforming mixture. Also, as depicted in FIGS. 1 and 3, in the first and second preferred embodiments the volume of the reforming mixture flow path in the preheater section 110 is less than the volume of the reforming mixture flow path in the reactor section 120. However, the present invention is not limited to such a configuration, and those skilled in the art will appreciate that, under certain circumstances, other embodiments are possible that have different ratios of flow path volume, and which may even eliminate the preheater section.

The recuperative reformer design can be accomplished in a similar way as for an air recuperator design taking into account chemical reactions in the reformer.

Figure 5:
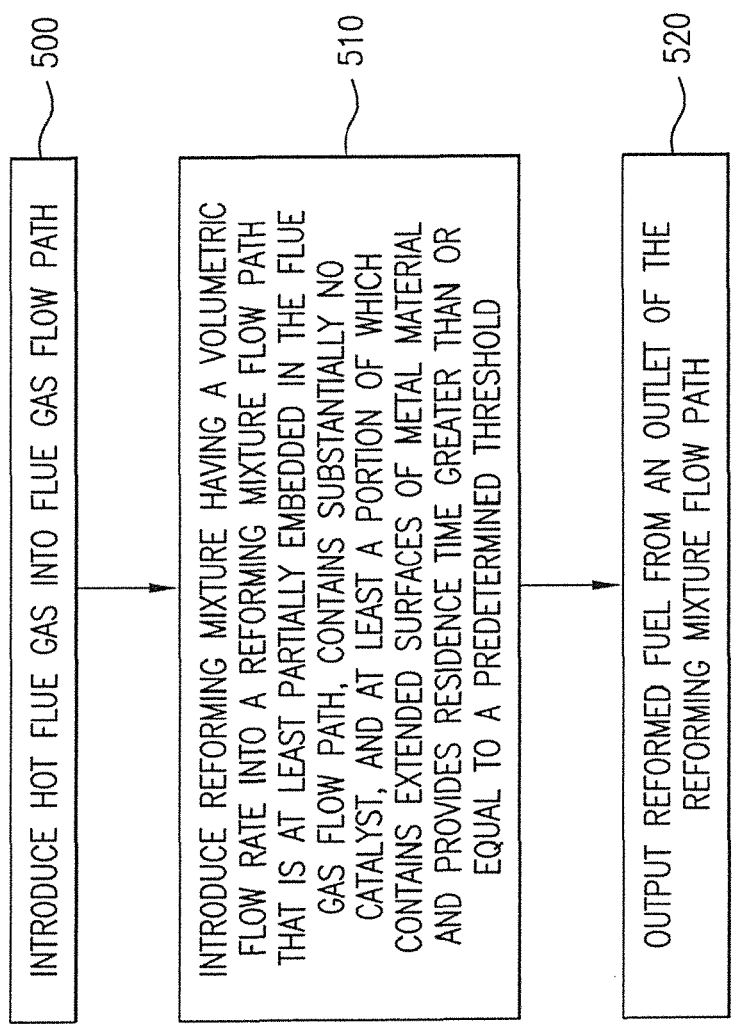
FIG. 5 depicts a flow chart for a reforming process in accordance with one preferred embodiment of the present invention.

FIG. 5 depicts a process of reforming fuel according to a preferred embodiment of the present invention. In step 500, hot flue gas is introduced into a flue gas flow path of a reformer. In step 510, a reforming mixture having a volumetric flow rate is introduced into a reforming mixture flow path of the reformer, wherein at least a portion of the reforming mixture flow path is embedded in the flue gas flow path to permit heat transfer from the flue gas in the flue gas flow path to the reforming mixture in the reforming mixture flow path, wherein the reforming mixture flow path contains substantially no material commonly used as a catalyst for reforming hydrocarbon fuel, e.g., nickel oxide, platinum group elements or rhenium, and wherein at least a part of the reforming mixture flow path contains extended surfaces of metal material that provide residence time greater than a predetermined threshold for the reforming mixture having the volumetric flow rate. In step 520, reformed fuel is output from an outlet of the reforming mixture flow path. Of course, the relative timing and order of steps 500 and 510 is not critical, as long as the reforming mixture is heated to a sufficient temperature for the desired reactions to take place.

Figure 6:
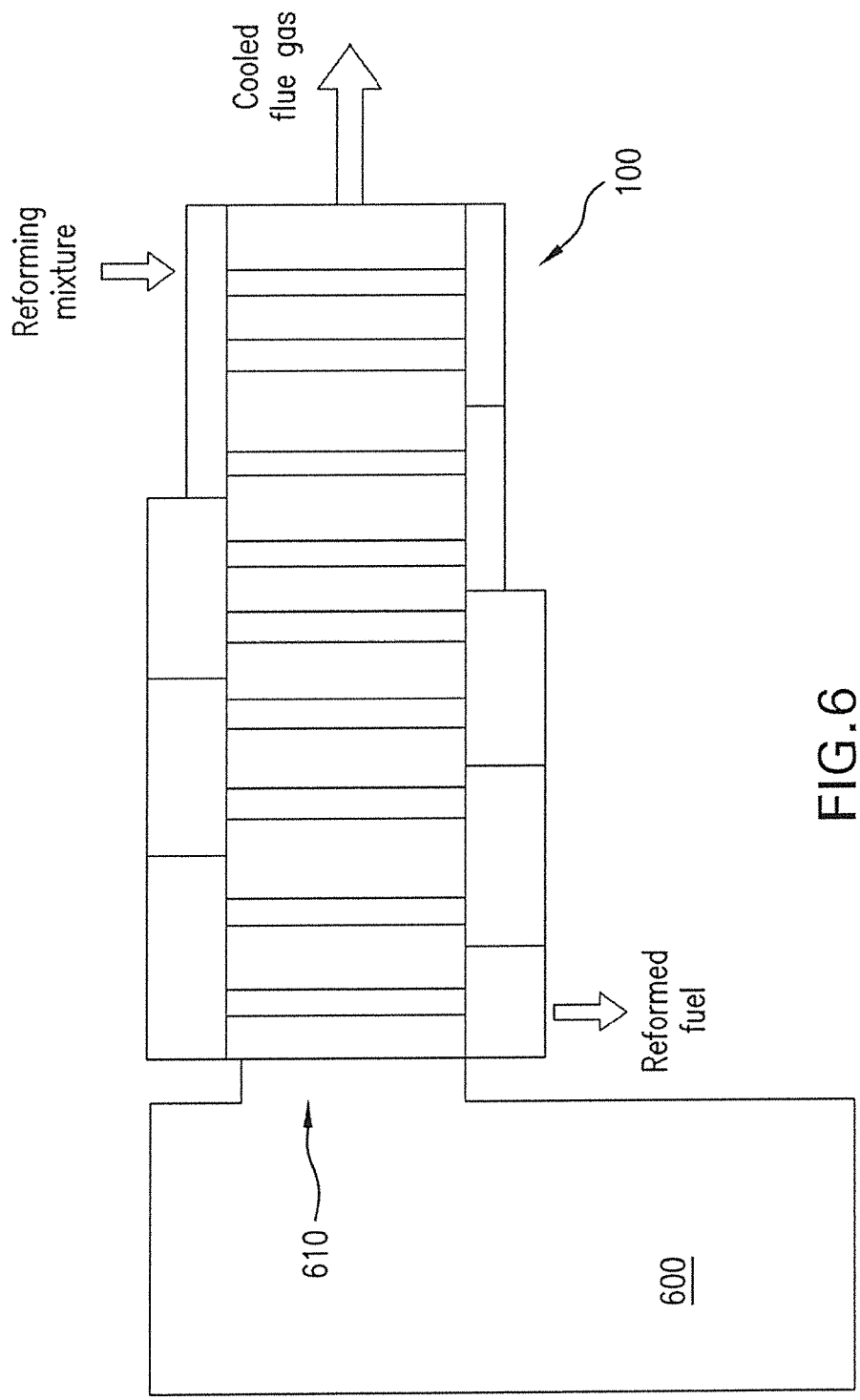
FIG. 6 depicts a thermal waste recovery system including a combustion chamber and a non-catalytic recuperative reformer in accordance with a preferred embodiment of the present invention.

FIG. 6 depicts a thermal waste recovery system according to a preferred embodiment of the present invention. The thermal waste recovery system includes at least one reaction chamber 600 in which a thermal process occurs, such as combustion in a furnace. The reaction chamber 600 has an outlet 610 through which flue gas exhaust gas) exits the reaction chamber and enters the flue gas flow path of a non-catalytic recuperative reformer, such as reformer 100 depicted in FIGS. 1 and 2.

Figure 7:
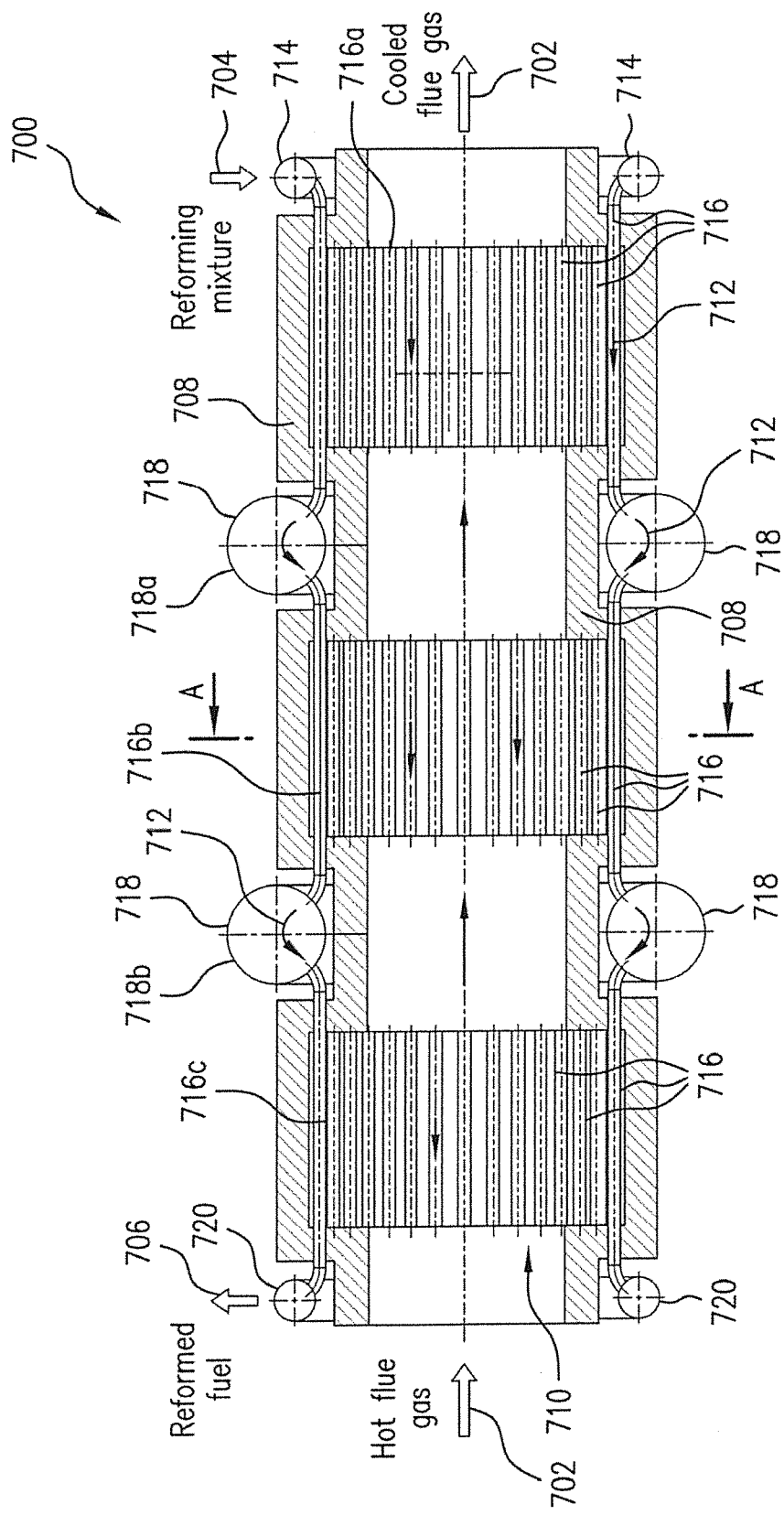
FIG. 7 depicts a flow diagram for one preferred embodiment of a radiant non-catalytic recuperative reformer according to the present invention.
Figure 8:
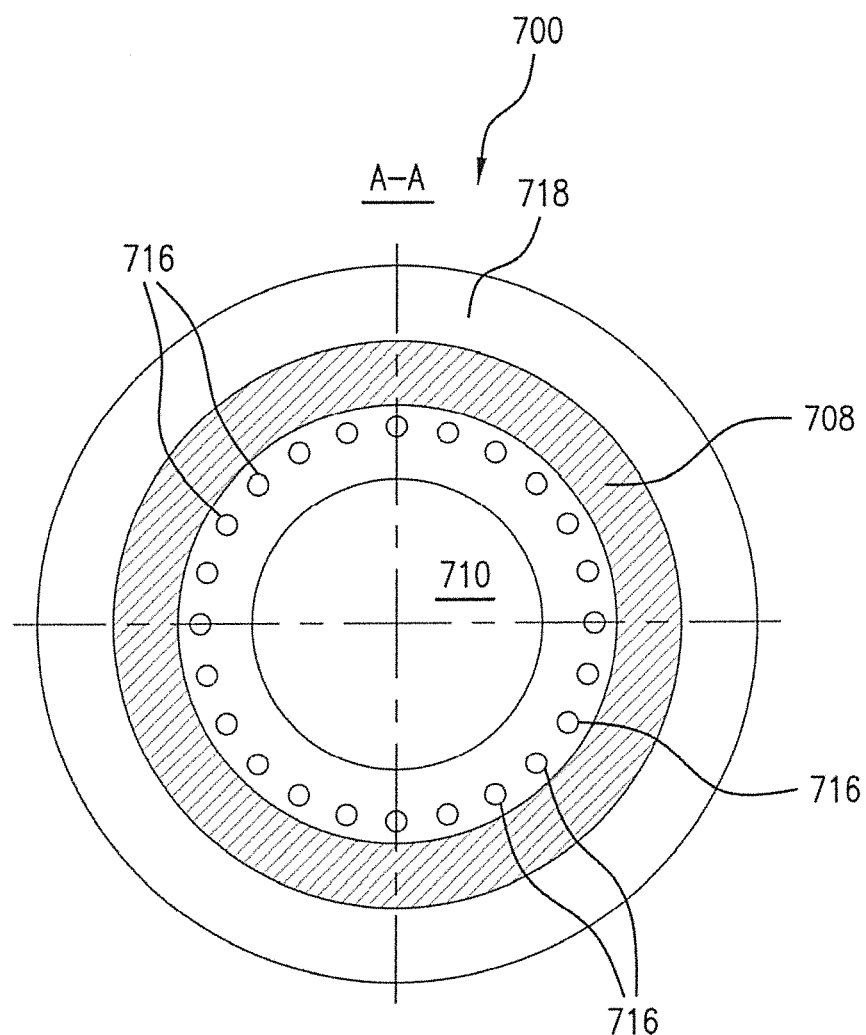
FIG. 8 depicts a cross-sectional view along line A-A of the reformer depicted in FIG. 7.

FIGS. 7 and 8 show a radiant non-catalytic recuperative reformer 700 according to another embodiment of this invention. The radiant non-catalytic recuperative reformer 700 of this embodiment includes a counterflow arrangement in which a hot flue gas 702 flows generally in one direction and a reforming mixture 704 flows generally in an opposite direction of the flue gas 702 to produce a partially reformed fuel 706. However, the reformer 700 of this invention may not comprise a counterflow arrangement and may instead comprise another flow arrangement including, but not limited to, a corresponding flow arrangement or an alternating flow arrangement.

In preferred embodiment of this invention, the reforming mixture 704 comprises at least one of a mixture of hydrocarbon fuel and flue gas, a mixture of fuel and steam, a mixture of fuel and carbon dioxide, or a mixture of fuel with flue gas and steam. And, the radiant non-catalytic recuperative reformer provides a reformed fuel including at least one of hydrogen ($H_2$), carbon monoxide (CO) carbon dioxide ($CO_2$), nitrogen ($N_2$), water vapor ($H_2O$) and/or unreformed hydrocarbons ($C_nH_m$).

In the embodiment of FIGS. 7 and 8, the radiant non-catalytic recuperative reformer 700 comprises a duct 708 providing a flue gas flow path 710 and wherein the flue gas flow duct 708 is configured to receive hot flue gas 702 from a thermal process. In a preferred embodiment of this invention, the flue gas 702 comprises an exhaust gas with a high temperature ranging from 2,000° F. to 2,800° F. The exhaust gas may be exhaust gas from steel making however the flue gas may not be limited to the steel industry and may comprise any type of flue gas with temperature ranging from 2,000° F. to 2,800° F. In a preferred embodiment, the duct 702 may comprise a water-cooled duct with a refractory lining.

As shown in this embodiment, the radiant non-catalytic recuperative reformer 700 includes a reforming mixture flow path 712 that is at least partially positioned within a wall of the duct 708 to allow for heat transfer between the flue gas 702 in the flue gas flow path 710 and the reforming mixture 704 in the reforming mixture flow path 712. Unlike the previously described embodiments, the reforming mixture flow path 712 of this embodiment preferably does not pass directly through the flow path of the flue gas 702 but instead passes through a wall of a duct adjacent to the flue gas flow path 710. In a preferred embodiment, the reforming mixture flow path 712 is made of high temperature materials including, but not limited to, stainless steel. In an alternative embodiment, the reforming mixture flow path 712 may include Inconel™.

The reforming mixture flow path 712 of this invention preferably includes an input 714, a plurality of conduits 716, a collector 718, and an output 720. In the embodiment of FIG. 7, the reforming mixture 704 enters the reforming mixture flow path 712 at the input 714. The input 714 preferably comprises an annular duct surrounding the flue gas duct 708. The reforming mixture 704 then passes through a first set of the plurality of conduits 716a to a first collector 718a. The reforming mixture 704 then passes through a second set of the plurality of conduits 716b to a second collector 718b. The reforming mixture 704 then passes through a third set of the plurality of conduits 716c to the output 720. In this embodiment, the reforming mixture flow path 712 includes three set of conduits and two collectors. However, it should be understood that the reforming mixture flow path of this invention may include any number of conduits and collectors. In an embodiment of this invention, the conduits 716 preferably comprise a high temperature material, such as stainless steel and the collector 718 comprise a lower grade material which may include stainless steel. In another embodiment, the conduits 716 may comprise Inconel™.

In the embodiment of FIGS. 7 & 8, the plurality of conduits 716 are positioned within walls of the duct 708 to be adjacent to and in proximity to the flue gas flow path 710. The collectors 718 are annular pipes which are positioned outside of the duct 708 and spaced from the flue gas flow path 710. With this arrangement, a high heat transfer to the reforming mixture 704 occurs in the conduits 716 and a low heat transfer to the reforming mixture 704 occurs in the collectors 718. In an alternative embodiment, no heat transfer between the reforming mixture and the flue gas occurs in the collectors. In a preferred embodiment of this invention, the conduits 716 include a cross-sectional area that is smaller than a cross-section area of the collector 718. This design provides a high-velocity, short residence time for the reforming mixture 704 in the conduits 716 relative to a low-velocity and large residence time for the reforming mixture in the collectors 718. This design preferably provides an alternating cycle of high heat transfer in the conduits 716 and low heat transfer in the collectors 718 allowing for chemical reactions to occur to reform the reforming mixture 704 to a reformed fuel 706 without a catalyst. More specifically, allowing for the chemical reactions to occur without palladium, rhenium, or nickel oxide.

Flow rates through the conduits 716 and the collectors 718 depend on the application and dimensions of each design. In an embodiment of the invention, flow velocities in the conduits 716 should be high enough to provide efficient convective heat transfer inside the conduits 716. While flow velocities in the collectors 718 should be as low enough to provide large residence time in the collectors 718. For example, in an embodiment of this invention, the flow velocity in the conduits 716 is greater than 1 meter per second and the flow velocity in the collector 718 is less than 0.1 meter per second. In an embodiment of this invention, a total residence time in all conduits 716 ranges from 0.1 seconds to 1.0 second and a total residence time in all collectors 718 ranges from 1.0 seconds to 10.0 seconds. However, a person of skill in the art will understand that the flow rates, the flow velocities and the total residence times may vary from the ranges provide above, depending on the application of the radiant non-catalytic recuperative reformer 700.

In an alternative embodiment of this invention, the reforming mixture flow path 712 may include extended metal surfaces to provide a more efficient heat transfer between the flue gas 702 and the reforming mixture 704.

Figure 9:
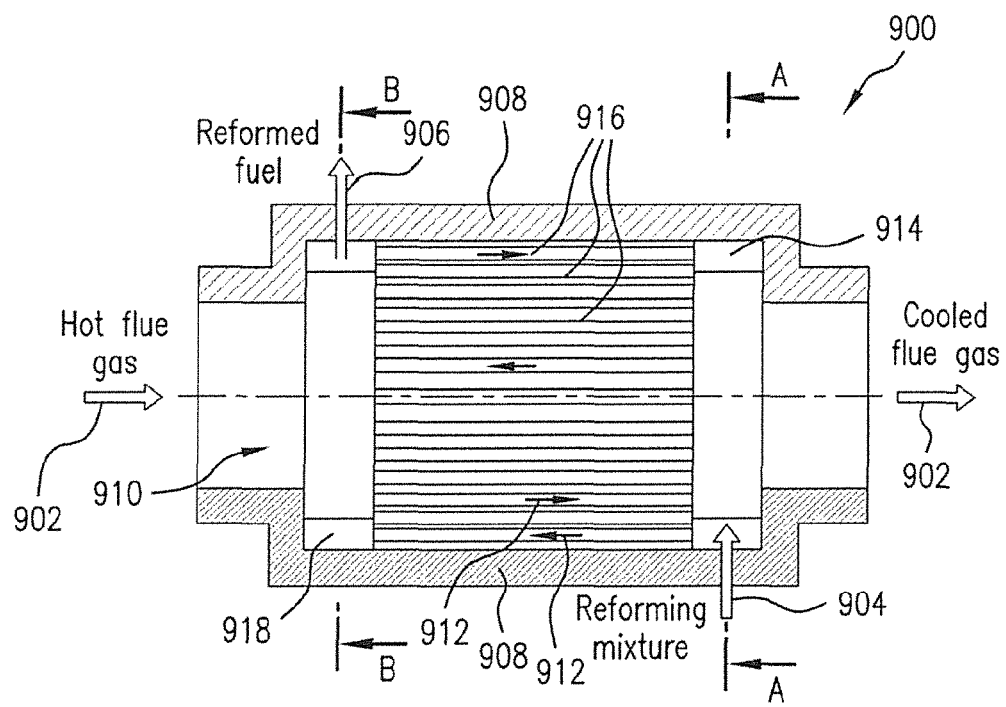
FIG. 9 depicts a flow diagram for another preferred embodiment of a radiant non-catalytic recuperative reformer according to the present invention.
Figures 10, 11:
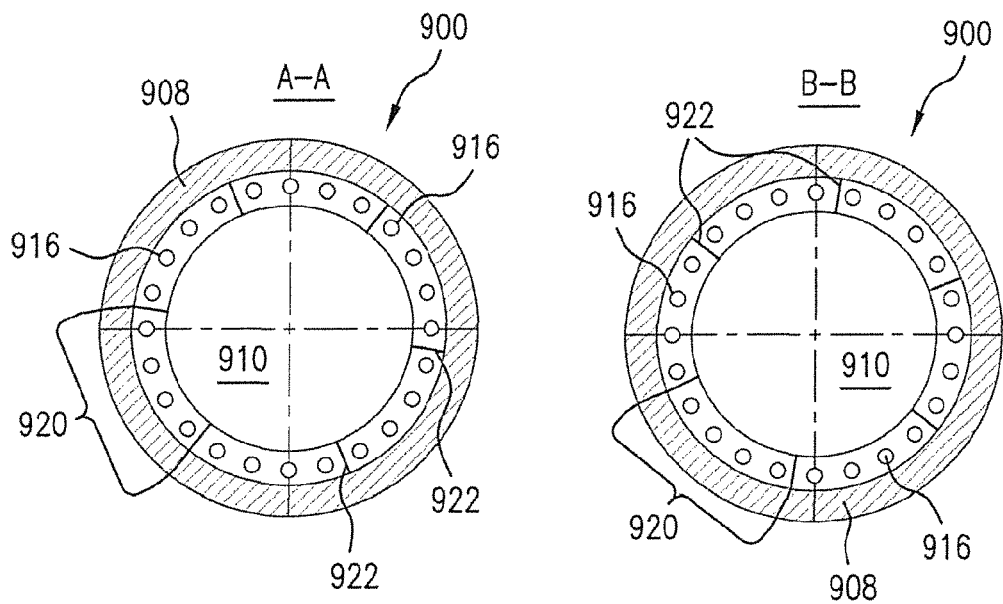
FIG. 10 depicts a cross-sectional view along line A-A of the reformer depicted in FIG. 9.
FIG. 11 depicts a cross-sectional view along line B-B of the reformer depicted in FIG. 9.

FIGS. 9-11 show a radiant non-catalytic recuperative reformer 900 according to another embodiment of this invention. The radiant non-catalytic recuperative reformer 900 of this embodiment includes an alternate flow arrangement in which a hot flue gas 902 flows generally in one direction while a reforming mixture 904 flows in multiple directions including in the same direction as the flue gas 902 and in an opposite direction of the flue gas 702 to produce a reformed fuel 906.

In the embodiment of FIGS. 9-11, the radian non-catalytic recuperative reformer 900 comprises a duct 908 providing a flue gas flow path 910 and wherein the flue gas flow duct 908 is configured to receive hot flue gas 902 from a thermal process. In a preferred embodiment, the flue gas 902 comprises an exhaust gas with a high temperature ranging from 2,000° F. to 2,800° F. The exhaust gas may be exhaust gas from steel making or any type of exhaust gas with a temperature ranging from 2,000° F. to 2,800° F. In a preferred embodiment, the duct 902 may comprise a water-cooled duct with a refractory lining.

In the embodiment of FIGS. 9-11, the radiant non-catalytic recuperative reformer 900 includes a reforming mixture flow path 912 wherein the reforming mixture flow path 912 is at least partially positioned within a wall of the duct 908 to permit heat transfer between flue gas 902 in the flue gas flow path 910 and reforming mixture 904 in the reforming mixture flow path 912. In a preferred embodiment, the reforming mixture flow path 912 is made of high temperature materials including, but not limited to, stainless steel. In an alternative embodiment, the reforming mixture flow path 912 may include Inconel™.

In a preferred embodiment, the reforming mixture flow path 912 comprises a first collector 914, a second collector 918 and a plurality of conduits 916 connecting the first collector 914 to the second collector 918. As best shown in FIGS. 10 and 11, the collectors 914, 918 of this embodiment do not form a continuous loop, like embodiment of FIG. 7 does. Instead, the collectors 914, 918 are divided into sections 920 with dividers 922. In the embodiment of FIGS. 10 and 11, the collectors 914, 918 are each divided into six sections 920, each section connected to four conduits 916. However, it should be understood that the collectors may be divided into any number of sections having any number of conduits.

In operation, the reforming mixture 904 enters the first collector 914 in a first section and passes through the conduits 916 connected to the first section and into a first section of the second collector 918 and then returns to a second section of the first collector 914 and then returns a second section of the second collector 918. This back and forth movement of the reforming mixture 904 continues until the reforming mixture 904 has been converted to the reformed fuel 906 and reaches an output of the radiant non-catalytic recuperative reformer 900.

In a preferred embodiment of this invention, a high heat transfer to the reforming mixture 904 occurs in the conduits 916 and a low heat transfer to the reforming mixture 904 occurs in the collectors 914, 918. In a preferred embodiment of this invention, the conduits 916 include a cross-sectional area that is smaller than a cross-section area of the collectors 914, 918, providing a high-velocity, short residence time for the reforming mixture 904 in the conduits 916 relative to a low-velocity and large residence time for the reforming mixture in the collectors 914, 918. This design preferably provides an alternating cycle of high heat transfer and low heat transfer allowing for chemical reactions to occur to reform the reforming mixture 904 to a reformed fuel 906 without a catalyst. In an embodiment of the invention, flow velocities in the conduits 916 should be high enough to provide efficient convective heat transfer inside the conduits 916. While flow velocities in the collectors 914, 918 should be as low enough to provide larger residence time in the collectors 914,918. In an embodiment of this invention, the flow velocity in the conduits 916 is greater than 1 meter per second and the flow velocity in the collector 914, 918 is less than 0.1 meter per second. In an embodiment of this invention, a total residence time in all conduits ranges from 0.1 seconds to 1.0 second and a total residence time in all collectors ranges from 1.0 second to 10.0 seconds. However, a person of skill in the art will understand that the flow rates, the flow velocities and the total residence times may vary from the ranges provide above, depending on the application of the radiant non-catalytic recuperative reformer 900.

In an alternative embodiment of this invention, the reforming mixture flow path 912 may include extended metal surfaces to provide a more efficient heat transfer between the flue gas 902 and the reforming mixture 904.

The preferred embodiments described above, and others that those skilled in the art will recognize as being within the scope of the present invention defined by the claims below, provide benefits regarding fuel efficiency and decreased emissions, while doing so at a reduced cost and/or lower temperatures than certain prior art reforming techniques. In particular, reforming of natural gas with recycled exhaust gas or steam can significantly reduce fuel consumption, $CO_2$ and $NO_x$ emissions, and cost, as well as increase process thermal efficiency. The reforming apparatus and method described above relate to a non-catalytic recuperative reformer that does not utilize expensive catalysts commonly used to reform hydrocarbon fuel. This reduces the capital cost of the reformer and allows elimination of catalyst maintenance and replacement, which further reduces the cost. Moreover, the efficiency of the non-catalytic recuperative reformer does not deteriorate over time due to a reduction of catalyst activity. By decreasing the reformer cost and/or operating temperature, such an apparatus and/or method may make fuel reforming practical in a wider variety of contexts (for example, lower temperature processes), as well as improving the efficiency of fuel reforming in current industrial applications.

The maximum benefits of the present invention are obtained by using no catalytic material in the reformer, as in the preferred embodiments described in detail above. However, some benefit may be obtained by making a reformer that is substantially free from catalytic material yet contains a small amount of a catalyst (such as nickel, rhodium, platinum or rhenium). Such a reformer would still require periodic regeneration and replacement of the catalyst, but the relatively small amount of catalyst would lower the capital cost and could decrease the maintenance cost. Thus, while the most preferred embodiments contain no catalyst from among nickel oxide, rhenium and the platinum group elements, some benefits of the present invention may be obtained from embodiments containing substantially no such catalyst (e.g., less than about 10% of such a catalyst by mass).

The present invention has been described above with respect to particular preferred embodiments. However, the details of the specific exemplary embodiments should not be construed as limitations on the scope of the invention. Rather, the scope of the invention should be measured by the following claims.

We claim:

1. A radiant non-catalytic recuperative reformer comprising:
    a duct including a flue gas flow path, wherein the duct is configured to receive hot flue gas from a thermal process;
    a reforming mixture flow path wherein the reforming mixture flow path is at least partially positioned within a wall of the duct to permit heat transfer between flue gas in the flue gas flow path and reforming mixture in the reforming mixture flow path; and
    wherein the reforming mixture flow path comprises a conduit and a collector, and wherein a cross-sectional area of the conduit is smaller than a cross-sectional area of the collector providing a high-velocity, short residence time for a reforming mixture in the conduit relative to a low-velocity and large residence time for the reforming mixture in the collector.

2. The radiant non-catalytic recuperative reformer according to claim 1, wherein the collector is positioned outside of the duct.

3. The radiant non-catalytic recuperative reformer according to claim 2, wherein the reforming mixture resides in the collector for approximately 10 seconds.

4. The radiant non-catalytic recuperative reformer according to claim 1, wherein the flue gas comprises an exhaust gas with a temperature ranging from 2,000° F. to 2,800° F.

5. The radiant non-catalytic recuperative reformer according to claim 4, wherein the exhaust gas comprises exhaust from a steel making process.

6. The radiant non-catalytic recuperative reformer according to claim 1, wherein the reforming mixture flow path includes extended metal surfaces for efficient heat transfer between the flue gas and the reforming mixture.

7. The radiant non-catalytic recuperative reformer according to claim 1, wherein the reforming mixture flow path contains no palladium, rhenium, or nickel oxide.

8. The radiant non-catalytic recuperative reformer according to claim 1, wherein a residence time of the reforming mixture in the reforming mixture flow path ranges from 1 second to 2 minutes.

9. The radiant non-catalytic recuperative reformer according to claim 1, wherein the reforming mixture comprises one of a mixture of hydrocarbon fuel and flue gas, a mixture of fuel and steam, a mixture of fuel and carbon dioxide, or a mixture of fuel with flue gas and steam.

10. The radiant non-catalytic recuperative reformer according to claim 1, wherein a reformed fuel contains a combustible mixture of hydrogen ($H_2$), carbon monoxide (CO) carbon dioxide ($CO_2$), nitrogen ($N_2$), water vapor ($H_2O$) and unreformed hydrocarbons ($C_nH_m$).

11. A radiant non-catalytic recuperative reformer comprising:
    a duct including a flue gas flow path, wherein the flue gas flow duct is configured to receive hot flue gas from a thermal process;
    a reforming mixture flow path wherein the reforming mixture flow path is at least partially positioned within a wall of the duct to permit heat transfer between flue gas in the flue gas flow path and reforming mixture in the reforming mixture flow path, wherein the reforming mixture flow path comprises a first collector, a plurality of conduits, and a second collector, wherein the first collector is divided into at least a first section and a second section and the second collector is divided into at least a first section and a second section, and wherein a reforming mixture enters the first section of the first collector, passes through at least one of the plurality of conduits to the first section of the second collector, the reforming mixture then passes through at least one of the plurality of conduits to the second section of the first collector, and then the reforming mixture passes through at least one of the plurality of conduits to the second section of the second collector;
    and wherein a cross-sectional area of the each of the conduits is smaller than a cross-sectional area of the collectors, providing a high-velocity, short residence time for a reforming mixture in the conduits relative to a low-velocity and large residence time the reforming mixture in the collectors.

12. The radiant non-catalytic recuperative reformer according to claim 11, wherein the collectors are positioned outside of the duct.

13. The radiant non-catalytic recuperative reformer according to claim 11, wherein the flue gas comprises an exhaust gas with a temperature ranging from 2,000° F. to 2,800° F.

14. The radiant non-catalytic recuperative reformer according to claim 11, wherein the reforming mixture flow path includes extended metal surfaces for efficient heat transfer between the flue gas and the reforming mixture.

15. The radiant non-catalytic recuperative reformer according to claim 1, wherein a residence time of the reforming mixture in the reforming mixture flow path ranges from 1 second to 2 minutes.

16. A method of reforming hydrocarbon fuel with a radiant non-catalytic recuperative reformer, comprising the steps of:
    introducing hot flue gas from a thermal process into a duct surrounding a flue gas flow path;

introducing a reforming mixture having a volumetric flow rate into a reforming mixture flow path of the reformer, wherein a portion of the reforming mixture flow path is positioned within a wall of the duct to permit heat transfer from the flue gas in the flue gas flow path to the reforming mixture in the reforming mixture flow path, wherein the reforming mixture flow path includes a plurality of conduits and a collector, wherein the cross-sectional area of each of the conduits is smaller than a cross-sectional area of the collector providing a high-velocity, short residence time for the reforming mixture in the conduits relative to a low-velocity, large residence time for the reforming mixture in the collector; and outputting reformed fuel from an outlet of the reforming mixture flow path.

17. The method of reforming hydrocarbon fuel according to claim 16, wherein the collector is positioned outside of the duct.

18. The method of reforming hydrocarbon fuel according to claim 16, wherein the reforming mixture resides in the collector for approximately 10 seconds.

19. The method of reforming hydrocarbon fuel according to claim 16, wherein the flue gas comprises an exhaust gas with a temperature ranging from 2,000° F. to 2,800° F.

20. The method of reforming hydrocarbon fuel according to claim 16, wherein the reforming mixture resides in the reforming mixture flow path for a period of about 1 second to about 2 minutes.

\* \* \* \* \*